(12) United States Patent
Leibbrand et al.

(10) Patent No.: US 11,926,307 B2
(45) Date of Patent: Mar. 12, 2024

(54) METHOD FOR DEFINING AT LEAST ONE CHARACTERISTIC CURVE OF A PRESSURE-MEDIUM-ACTUATED BRAKE SYSTEM OF A VEHICLE

(71) Applicant: Knorr-Bremse Systeme Fuer Nutzfahrzeuge GmbH, Munich (DE)

(72) Inventors: Jonas Leibbrand, Eberdingen-Nussdorf (DE); Oliver Jundt, Hessigheim (DE); Soeren Muennig, Muehlacker (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 235 days.

(21) Appl. No.: 17/671,914

(22) Filed: Feb. 15, 2022

(65) Prior Publication Data
US 2022/0289157 A1    Sep. 15, 2022

(30) Foreign Application Priority Data

Mar. 9, 2021   (EP) .................................... 21161400

(51) Int. Cl.
*B60T 8/94*    (2006.01)
*B60T 8/32*    (2006.01)
(Continued)

(52) U.S. Cl.
CPC ................ *B60T 8/94* (2013.01); *B60T 8/321* (2013.01); *B60T 13/683* (2013.01);
(Continued)

(58) Field of Classification Search
CPC .......... B60T 8/94; B60T 8/321; B60T 13/683; B60T 17/221; B60T 7/12; B60T 2201/03;
(Continued)

(56) References Cited

U.S. PATENT DOCUMENTS

| 2002/0000750 A1* | 1/2002 | Harris ..................... B60T 7/042 |
| | | 303/20 |
| 2011/0006596 A1* | 1/2011 | Leiber ............... F16D 55/22655 |
| | | 303/13 |

(Continued)

FOREIGN PATENT DOCUMENTS

| CN | 101835985 A | 9/2010 |
| CN | 101903227 A | 12/2010 |

(Continued)

*Primary Examiner* — Sizo B Vilakazi
(74) *Attorney, Agent, or Firm* — NORTON ROSE FULBRIGHT US LLP; Gerard A. Messina (57) ABSTRACT

A method for defining at least one characteristic curve which, in a pressure-actuated brake system of a vehicle, represents a relationship between a brake pressure and a brake demand), and for operating a pressure-actuated brake system of a vehicle, in which at least one brake cylinder can be supplied with a pressurized medium under a brake pressure, and in which the brake pressure is formed based on at least one such characteristic curve, and to a pressure-actuated brake system of a vehicle in which at least one brake cylinder can be supplied with a pressurized medium under a brake pressure.

21 Claims, 4 Drawing Sheets

(51) Int. Cl.
*B60T 13/68* (2006.01)
*B60T 17/22* (2006.01)
*B60T 7/12* (2006.01)

(52) U.S. Cl.
CPC .............. *B60T 17/221* (2013.01); *B60T 7/12* (2013.01); *B60T 2201/03* (2013.01); *B60T 2270/402* (2013.01); *B60T 2270/406* (2013.01)

(58) Field of Classification Search
CPC ......... B60T 2270/402; B60T 2270/406; B60T 8/172; B60T 2270/14; B60T 2270/204; B60T 2270/306; B60T 2201/00; B60T 8/1806; B60T 13/74; B60T 17/22
See application file for complete search history.

(56) References Cited

U.S. PATENT DOCUMENTS

| | | | |
|---|---|---|---|
| 2018/0029568 A1* | 2/2018 | Hoehn | B60T 8/174 |
| 2018/0162338 A1* | 6/2018 | Irwan | B60T 8/171 |
| 2022/0289158 A1* | 9/2022 | Leibbrand | B60T 17/221 |

FOREIGN PATENT DOCUMENTS

| | | |
|---|---|---|
| CN | 101909921 A | 12/2010 |
| CN | 111959476 A | 11/2020 |
| EP | 1016574 A2 | 7/2000 |
| WO | 2018104740 A1 | 6/2018 |

* cited by examiner

METHOD FOR DEFINING AT LEAST ONE CHARACTERISTIC CURVE OF A PRESSURE-MEDIUM-ACTUATED BRAKE SYSTEM OF A VEHICLE

RELATED APPLICATION INFORMATION

The present application claims priority to and the benefit of European patent application no. 21161400.3, which was filed in Europe on Mar. 9, 2021, the disclosure which is incorporated herein by reference.

FIELD OF THE INVENTION

The invention relates to a method for defining at least one characteristic curve which, in a pressure-medium-actuated brake system of a vehicle, represents a relationship between a brake pressure and a brake demand, according to an embodiment as described herein, a characteristic curve which has been defined according to such a method, according to an embodiment as described herein, a method for operating a pressure-medium-actuated brake system of a vehicle, in which at least one brake cylinder can be supplied with a pressurized medium under a brake pressure, and in which the brake pressure is formed on the basis of at least one such characteristic curve, according to an embodiment as described herein, and a pressure-medium-actuated brake system of a vehicle in which at least one brake cylinder can be supplied with a pressurized medium under a brake pressure, according to an embodiment as described herein.

BACKGROUND INFORMATION

Driver assistance systems can communicate a brake demand to such brake systems. This is usually done with the aid of an electrical brake demand signal, which specifies a target deceleration of the vehicle. The brake system can set this target deceleration using a closed control loop. For this purpose, the actual deceleration of the vehicle is determined via the measured wheel speeds, for example, and compared with the target deceleration. If the actual deceleration deviates from the target deceleration, brake pressure is increased or reduced accordingly. In this case, the brake demand signal usually covers a fixed range of values and, apart from special coding for error indication, has no deviating meaning. The value range is processed and interpreted by the brake system in the same way over the entire value range.

For autonomous driving of the vehicle, the demand on the control quality of the brake system increases. The control loop is often closed in a complex longitudinal deceleration controller, which can be located outside the brake system. Even though the direct controlled variable in the longitudinal deceleration controller does not have to correspond exactly to the physical variable (deceleration of the vehicle in m/s$^2$) used by the brake system to close the loop, this is a known problem. In particular, due to the inertia of electro-pneumatic brake systems, requirements on the controller speed for a stable controller cascade cannot be met or can only be met to a limited extent.

For these reasons, in autonomous driving mode the braking of the vehicle requested by the longitudinal deceleration controller is often implemented by the electro-pneumatic brake system without a closed control loop, which leads to a largely linear relationship between the brake demand and the output brake pressure, at least at one operating point. However, disturbances such as road inclination, wind, etc. and assumptions that deviate from reality, such as the estimated vehicle mass, brake coefficient, etc., are still compensated for by the longitudinal deceleration controller, for example. For autonomous driving of the vehicle, it must be possible for the brake system to perform a requested brake with a high degree of safety and reliability.

SUMMARY OF THE INVENTION

An object of the invention is to enable a brake demand or request to be performed by the brake system with a high degree of safety and reliability.

This object may be solved by the features of the main embodiments, as described herein.

It may be assumed that a high level of safety and reliability of the overall system is ensured via a single variable which is transmitted, for example, as a brake demand or request from a longitudinal deceleration controller to the brake system (e.g. via CAN or other transmission systems).

In this case, a brake demand or request, which in particular originates from an autonomous driving system or from a driver assistance system, is interpreted and executed in a brake system, in particular an electro-pneumatic brake system, taking into account control and safety challenges. Here, on the one hand, the behavior of a closed control loop with a tendency to increase the brake demand in the case of an under-braked vehicle, the above-mentioned requirements on an electro-pneumatic braking system when executing autonomously generated brake demands, and the presence of redundant components in an electro-pneumatic brake system may be taken into account.

A first aspect of the invention presents a method for defining at least one characteristic curve which, in a pressure-actuated brake system of a vehicle, represents a relationship between a brake pressure (p) and a brake demand ($a_{soll}$), comprising at least the following steps:

a) specifying a brake demand value range for the brake demand ($a_{soll}$), which includes a minimum brake demand, a maximum brake demand, and intermediate values between the minimum brake demand and the maximum brake demand, b) specifying a brake pressure value range for the brake pressure (p), which includes a minimum brake pressure, a maximum brake pressure and intermediate values between the minimum brake pressure and the maximum brake pressure, b1) defining a support point of the characteristic curve, at which a brake demand limit value and a specific brake pressure are associated with each other, wherein the brake demand limit value lies within the brake demand value range and is greater in amount than the amount of the minimum brake demand but less than the amount of the maximum brake demand, and wherein the specific brake pressure lies within the brake pressure value range and is equal to the maximum brake pressure, b2) defining another support point that assigns the maximum brake pressure and the maximum brake demand to each other, b3) defining a characteristic curve section of the characteristic curve, which extends between the support point and the another support point, and which automatically assigns the maximum brake pressure to each brake request ($a_{soll}$) in a brake demand range (III).

The brake demand value range and the brake pressure value range represent concluding ranges in this respect, because values outside these ranges are not possible or not provided for. In electro-pneumatic brake systems, for example, the reservoir pressure within a pressure reservoir always represents the maximum (applicable) brake pressure because no greater brake pressure can be generated compared to this reservoir pressure.

The characteristic curve and the characteristic curve section of the characteristic curve is defined in particular independently of a vehicle deceleration-dependent brake pressure distribution between a front axle and a rear axle or between a right wheel and a left wheel. In such a known vehicle deceleration-dependent brake pressure distribution, it is taken into account, for example, that the rear axle deflects during brake and then the normal forces at the rear axle decrease, so that the rear axle would tend to brake lock if the brake pressure at the rear axle is not lowered relative to the brake pressure at the front axle, for example, once a certain limit deceleration is reached.

According to the invention, the value range of the brake demand is divided into at least two brake demand ranges, where there is one top end brake demand range (III). In this top end brake demand range (III), the characteristic curve section of the characteristic curve is formed by a vertical line which extends between the support point and the another support point in a diagram, which reflects the relationship between the brake pressure (p) and the brake demand ($a_{soll}$).

This characteristic curve section therefore does not actually have any characteristic property in the strict sense, because it automatically assigns the maximum (applicable) brake pressure to each brake demand within the brake demand range (III). This brake demand range (III) is particularly an emergency brake demand range (III) at the top end of the brake demand value range, where the maximum applicable brake pressure is requested.

As a whole (top end) brake demand range (III) is available, wherein each brake demand is related to the maximum applicable brake pressure or wherein the maximum brake pressure is automatically assigned to each brake request or demand, there is no need for time-consuming individual calculations and assignments between brake demands and brake pressures.

In an example, it is assumed that there is a fault in a component of the brake system, for example a software error or a hardware defect in a primary electronic brake control unit. When e. g. a longitudinal deceleration controller then requests braking from the brake system, however, no brake pressure is generated by the brake system from the primary brake control unit affected by the defect. The longitudinal deceleration controller then very quickly increases the brake demand up to the brake demand range because no actual deceleration of the vehicle could be detected and therefore vehicle braking has failed to occur. The brake system then controls the maximum brake pressure into all brake cylinders in the third brake demand range by a redundant secondary electronic brake controller of the brake system. This may be done with all available solenoid valve devices/actuators that can supply brake pressure to the brake cylinders. Therefore, all redundant electronic brake controllers, solenoid valve devices, and brake cylinders may then be used to increase the likelihood of brake application and to compensate for defects in hardware or software. The determination of the brake pressure in this is then just not done here via the first or second characteristic curve sections, i.e. by individual calculations or assignments, but may be done in the characteristic curve section, in which the maximum (applicable) brake pressure is automatically assigned to each brake request. On the one hand, this allows potential errors in the software and hardware to be compensated. Further, time-consuming individual calculations and assignments between brake demands and brake pressures can be omitted because the maximum brake pressure is automatically assigned to each brake request or demand. In particular, the brake system and its components are not checked for defects because this would take too much time. However, functions of the brake system that ensure vehicle stability, for example by controlling the brake pressure individually for each wheel, e.g. as part of a brake slip control system (ABS), traction control system (ASR) or vehicle dynamics control system (ESP), can remain active depending on the availability of the corresponding hardware. Such availability is given, for example, if corresponding routines are implemented in the redundant, secondary brake control unit.

The support point may be a third support point of the characteristic curve (2) and the another support point is a fourth support point of the characteristic curve (2) and the characteristic curve section is a third characteristic curve section of the characteristic curve and the (top end) brake demand range (III) is a third brake demand range and the brake demand limit value is a third brake demand limit value and the specific brake pressure ($p_3$) is a third brake pressure.

The third brake demand limit may be smaller in amount than the amount of the maximum brake demand.

Further, the method may be characterized the following further steps: defining at least two further characteristic curve sections (2a, 2a', 2a''; 2b, 2b', 2b'') of the characteristic curve (2), by:

a) defining a first support point of the characteristic curve, at which a first brake demand limit value and a first brake pressure (p1) are assigned to one another, the first brake demand limit value lying within the brake demand value range and the first brake pressure (p1) lying within the brake pressure value range, and the first brake demand limit value representing a minimum brake demand and the first brake pressure representing a minimum brake pressure, b) defining a second support point of the characteristic curve, at which a second brake demand limit value and a second brake pressure (p2) are associated with each other, wherein the second brake demand limit value lies within the brake demand value range and is greater in amount than the amount of the minimum brake demand but smaller than the amount of the maximum brake demand, and wherein the second brake pressure (p2) is within the brake pressure value range and is greater than the minimum brake pressure but less than the maximum brake pressure, c) defining a first characteristic curve section of the characteristic curve which extends between the first support point and the second support point and which, in a first brake demand range (I), represents the relationship between the brake pressure (p) and the brake demand ($a_{soll}$), d) defining a second characteristic curve section of the characteristic curve which extends between the second support point and the third support point and which, in a second brake demand range (II), represents the relationship between the brake pressure (p) and a brake demand ($a_{soll}$).

Thus, the value range of the brake demand may be divided into three brake demand ranges. However, more than three brake demand ranges may also be provided.

Further, at least three characteristic curve sections of the characteristic curve may be defined, which can be configured differently with regard to the respective assignment between the brake demand and the brake pressure resulting from the brake demand. In particular, the at least three characteristic curve sections of the characteristic curve may have different gradients.

The advantages of this embodiment of the method become apparent from the following description of practical examples.

In the case of partial braking, which is controlled here by the first characteristic curve section, for example, the longitudinal deceleration controller usually requests a relatively moderate deceleration of the vehicle, so that the brake request or demand then lies within the first brake request range, for example. Depending on the estimated total vehicle mass, different first characteristic curve sections with, for example, different gradients are present or specified. Based on the first characteristic curve section of the characteristic curve assigned to the relevant vehicle mass, a specific brake pressure is then assigned to the moderate brake demand here. The longitudinal deceleration controller also measures the vehicle reaction in the form of the actual vehicle longitudinal deceleration and can adjust the brake demand and thus the brake pressure even in the event of relatively small changes in the actual longitudinal deceleration. This is done with little time delay, since the brake system itself need not have a longitudinal deceleration controller or a closed control loop.

In another example, it is assumed that the vehicle is under-braked because, for example, the total vehicle mass has been estimated too low, or because other assumptions, such as the braking effect of the trailer brake (characteristic pressure to brake torque) do not apply. The closed loop in the longitudinal deceleration controller outside the brake system then increases the brake demand or the target vehicle longitudinal deceleration. If the brake demand corrected by the longitudinal deceleration controller thereby exceeds the second brake demand limit value, then it is in the second brake demand range and the brake pressure is generated according to the second characteristic curve section of the characteristic curve. For example, the second characteristic curve section has a greater slope than the first characteristic curve section. Consequently, in the case of an under-braked vehicle, any further increase in the brake demand, in this case caused for example by the longitudinal deceleration controller, leads to what may be a linear increase in the output brake pressure because of the steeper course or gradient of the second characteristic curve section. In this case, the vehicle deceleration can still be controlled by the longitudinal deceleration controller by varying the brake demand, while at the same time ensuring that, for example, the maximum applicable brake pressure can be achieved.

In summary, therefore, the invention has the following advantages:
Avoidance of an underbraked vehicle for high target decelerations,
Ensuring controllable brake pressure up to the maximum brake pressure,
Improvement of controller stability and controller speed compared to a structure with controller cascade,
Reducing the risk of an unbraked vehicle.

Furthermore, it may be provided that the first characteristic curve section and/or the second characteristic curve section and/or the third characteristic curve section has (have) a linear course. The second characteristic curve section can also directly follow the first characteristic curve section and the third characteristic curve section the second characteristic curve section.

Particularly, the first characteristic curve section and/or the second characteristic curve section and/or the third characteristic curve section may be formed or specified as a function of a vehicle load of the vehicle, the vehicle load being determined or estimated.

Also, the minimum brake demand and the minimum brake pressure can each correspond to the value zero, so that the first interpolation or support point of the characteristic curve simultaneously represents the "origin" of the characteristic curve.

A second aspect of the invention presents at least one characteristic curve that represents a relationship between a brake pressure and a brake demand in a pressure fluid actuated brake system, the characteristic curve having been defined or determined according to a method described above.

A third aspect of the invention presents method for operating a pressure-medium-actuated brake system of a vehicle, in which at least one brake cylinder can be acted upon by a pressure medium which is under a brake pressure (p), and in which the brake pressure (p) is determined on the basis of at least one characteristic curve as described above or on the basis of at least one characteristic curve which is defined according to the method described above and which represents a relationship between the brake pressure (p) and a brake demand ($a_{soll}$), comprising at least the following steps: It is checked whether the brake demand ($a_{soll}$) lies in the third brake demand range (III), and if so, the brake pressure (p) is determined on the basis of the third characteristic curve section, and then the at least one brake cylinder is acted upon with the maximum brake pressure, and if not, the brake pressure (p) is not determined on the basis of the third characteristic curve section, but which may be on the basis of the first or second characteristic curve section.

The method may be characterized in that the brake system comprises at least one electronic brake control unit, and at least one solenoid valve device controlled by the at least one electronic brake control unit, wherein the characteristic curve is implemented in the at least one electronic brake control unit, and wherein the brake demand is input into the at least one electronic brake control unit, and wherein the at least one electronic brake control unit electrically actuate the at least one solenoid valve device as a function of the brake demand ($a_{soll}$), in order to generate the brake pressure (p).

Thereby, no check need be made whether the at least one electronic brake control unit is defective. This saves time to have the brake pressure generated as soon as possible by electronic brake control unit which are not defective.

The method may comprise at least the following further steps:
a) determining the brake pressure based on the first characteristic curve section or the second characteristic curve section depending on the brake demand at least by:
a1) check whether the brake demand is in the first brake demand range (I) or in the second brake demand range (II), and
a2) if the brake demand is in the first brake demand range (I), then determining the brake pressure according to the first characteristic curve section, and
a3) if the brake demand is in the second brake demand range (II), then determining the brake pressure according to the second characteristic curve section, and then
b) applying the determined brake pressure to the at least one brake cylinder.

As already explained above, the brake demand, on the basis of which the brake pressure is determined using the characteristic curve, can be generated by a vehicle longitudinal deceleration control system, a driver assistance system or by an autonomous vehicle control system. In particular, the vehicle longitudinal deceleration control can be integrated into the driver assistance system or into the autonomous vehicle control system.

The vehicle longitudinal deceleration control system may adjusts an estimated or determined actual vehicle longitudinal deceleration to a setpoint or target vehicle longitudinal deceleration, with the brake demand, on the basis of which the brake pressure is determined using the characteristic curve, being formed as a function of the setpoint or target vehicle longitudinal deceleration. The actual vehicle longitudinal deceleration is measured, for example, by at least one longitudinal deceleration sensor.

The brake system may comprise at least two independent electronic brake controllers, a first electronic brake controller and a second electronic brake controller, and at least one solenoid valve arrangement or device independently controlled by the first electronic brake controller and the second electronic brake controller, wherein the characteristic curve is implemented in the first electronic brake control unit and in the second electronic brake control unit, and the brake request is input into the first electronic brake control unit and the second electronic brake control unit, and the first electronic brake control unit and the second electronic brake control unit, depending on the brake request, independently of one another electrically control the at least one solenoid valve arrangement in order to generate the brake pressure.

The at least one solenoid valve arrangement can be formed in particular in a pressure control module which is electrically controlled by the first and/or second electronic brake control unit in order to control a regulated service brake pressure on the basis of a reservoir pressure originating from a pressure reservoir. The electrical control is used to specify a target service brake pressure. For this purpose, the pressure control module has a local electronic control unit which receives the signal for the setpoint brake pressure, the solenoid valve device, in particular as an inlet/outlet valve combination, and a relay valve which is pneumatically controlled by the solenoid valve device and whose operating output is then used to control the actual service brake pressure, which is measured by an integrated pressure sensor. The measured actual pressure value is then reported to the integrated local electronic control unit of the pressure control module, which then controls the integrated inlet/outlet valve combination to adjust the actual brake pressure to the target service brake pressure.

Further, the brake pressure may be determined on the basis of the third characteristic curve section if the brake demand lies in the third brake demand range (III), and then the at least one brake cylinder is (automatically) applied with the maximum brake pressure.

This embodiment refers to the example already described above, according to which it is assumed that there is a fault in a component of the brake system, for example a software fault or a hardware defect in a primary electronic brake control unit. However, when the longitudinal deceleration controller then requests braking from the brake system, no brake pressure is generated from the brake system by the primary electronic brake controller affected by the defect. The longitudinal deceleration controller then very quickly increases the brake demand up to the third brake demand range because no actual deceleration of the vehicle could be detected and therefore vehicle braking has failed to occur.

When a brake demand is made in this third brake demand range, the maximum (applicable) brake pressure is then automatically applied to at least one brake cylinder. This saves time because there is no longer any individual assignment between the respective brake demand and the brake pressure, but instead the maximum brake pressure is (automatically) requested and applied to the at least one brake cylinder.

The procedure may be advanced that
a) if the brake demand is in the first brake demand range or range (I) or in the second brake demand range (II), checking whether an electronic brake control device from the first electronic brake control device or the second electronic brake control device has a defect, and if this is the case, then the at least one solenoid valve arrangement or device is controlled by the remaining functional electronic brake control device which does not have a defect in order to generate the brake pressure, but
b) if the brake demand is in the third brake demand range (III), no check is made as to whether an electronic brake control device of the first electronic brake control device and/or the second electronic brake control device has a defect, and the at least one solenoid valve arrangement or device is controlled by the first electronic brake control device and by the second electronic brake control device to generate the brake pressure.

Feature b) has the particular advantage mentioned above that no time is lost due to the lack of a defect check and the maximum (applicable) brake pressure can then be applied relatively quickly to the at least one brake cylinder.

In the case of feature a), the check as to whether a brake control unit of the first electronic brake control unit and/or the second electronic brake control unit has a defect can be performed by self-monitoring of the first electronic brake control unit and the second electronic brake control unit, or also by external monitoring, in which case the first and second brake control units monitor each other, for example.

Alternatively, the at least one solenoid valve arrangement can also be formed in a parking brake module which is electrically controlled by the first and/or second brake control unit in order to control, for example, a regulated parking brake pressure for passive brake cylinders (spring brake cylinders) on the basis of a reservoir pressure originating from a pressure reservoir.

As already indicated above, the brake system can be or comprise
a) an electro-pneumatic service brake system, wherein the at least one brake cylinder is an active brake cylinder which is applied by increasing the brake pressure in the application direction and by decreasing the brake pressure in the release direction, and/or
b) an electro-pneumatic parking brake system, wherein the at least one brake cylinder is a passive spring brake cylinder which is applied by increasing the brake pressure in the release direction and by decreasing the brake pressure in the application direction.

A fourth aspect of the invention presents a pressurized fluid actuated brake system of a vehicle, wherein at least one brake cylinder is operable to be pressurized with a pressurized fluid under a brake pressure, wherein it is operated according to the method described above.

An embodiment of the invention is shown below in the drawings and explained in more detail in the following description.

DETAILED DESCRIPTION

Figure 4:
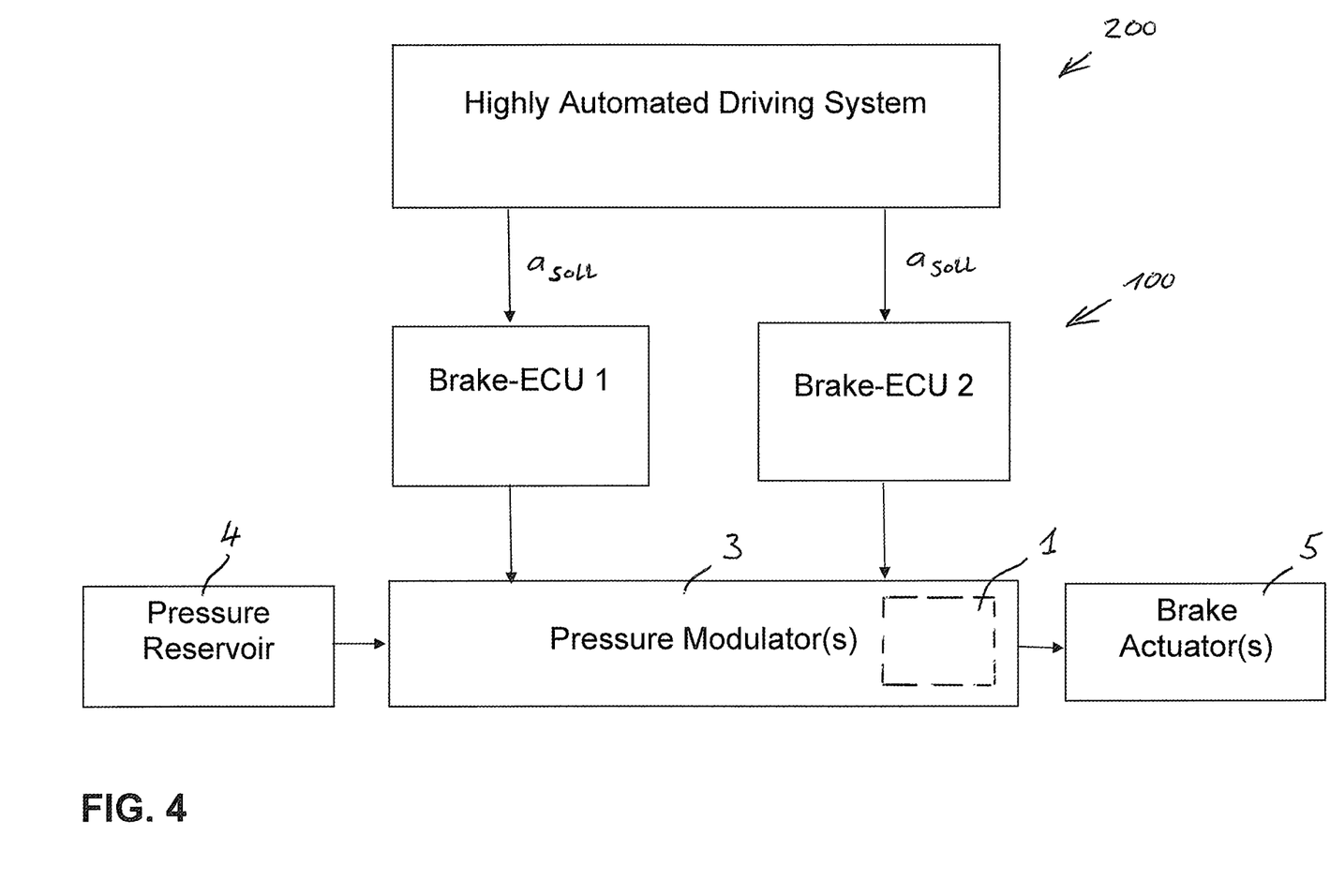
FIG. 4 a brake system according to an exemplary embodiment.

In FIG. 4, a pressure-fluid-actuated electronically controlled service brake system 100 of, for example, a heavy commercial vehicle is shown in highly schematic form, which is configured, for example, as an electro-pneumatic brake system and, in particular, as an electro-pneumatic brake pressure-controlled brake system (EBS).

The service brake system 100 here has, for example, at least two independent electronic brake control units, a first electronic brake control unit Brake-ECU 1 and a second electronic brake control unit Brake-ECU 2, which control the brake control/regulation functions and other higher-level functions such as a brake slip control (ABS), a traction slip control (ASR) and/or a vehicle dynamics control and/or also an axle-by-axle or side-by-side brake pressure distribution (BDV). Since the two electronic brake control units Brake-ECU 1 and Brake-ECU 2 are mutually redundant brake control units in the sense that if one of the electronic brake control units Brake-ECU 1 or Brake-ECU 2 fails, the other one, If one of the electronic brake control units Brake-ECU 1 or Brake-ECU 2 fails, the other, still intact electronic brake control unit Brake-ECU 1 or Brake-ECU 2 executes the brake control/brake regulation functions and the other higher functions, all the relevant software functions in particular are implemented in full in both electronic brake control units Brake-ECU 1 or Brake-ECU 2.

The two electronic brake control units Brake-ECU 1 or Brake-ECU 2 receive here, for example, from a Highly Automated Driving System (HADS) 200 a service brake request or demand signal $a_{soll}$ representing a target vehicle longitudinal deceleration $a_{soll}$ requested as a service brake demand and process this in order to control at least one solenoid valve arrangement or device 1 independently of one another depending on the service brake demand signal $a_{soll}$. For this purpose, a characteristic curve 2 described in more detail later is implemented in the first electronic brake control unit Brake-ECU 1 and in the second electronic brake control unit Brake-ECU 2.

Figure 2:
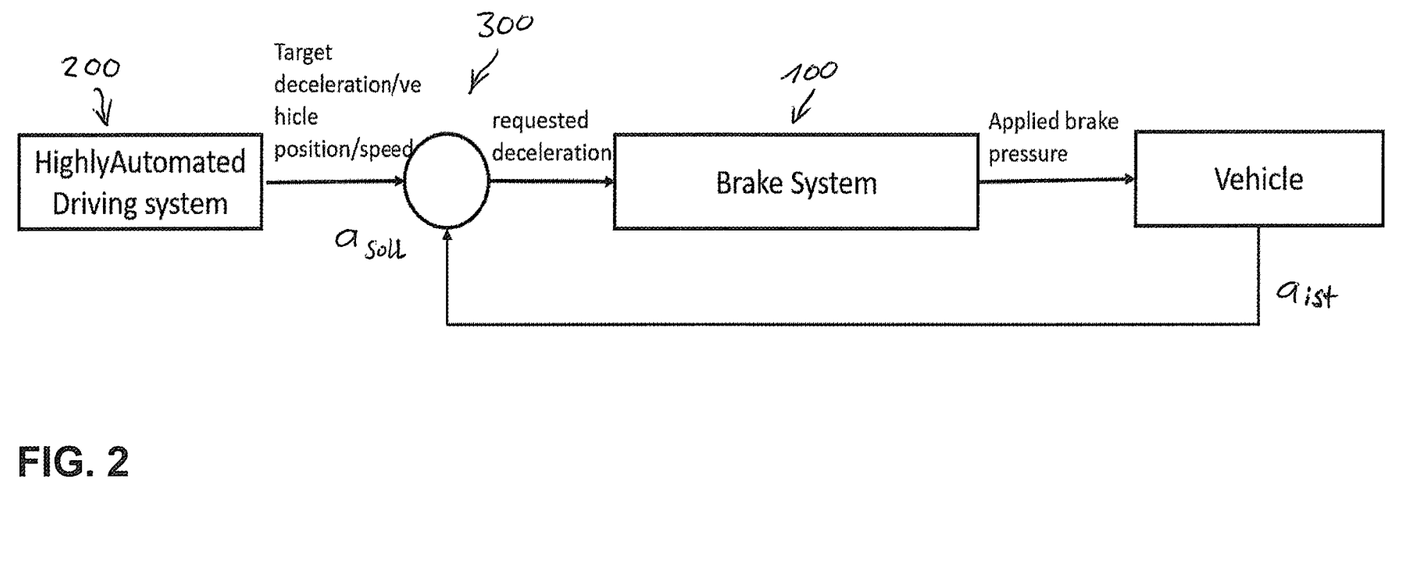
FIG. 2 a schematic representation of an autonomous driving system showing a longitudinal deceleration control system and a brake system controlled by the longitudinal deceleration control system, as well as a vehicle that can be braked by the brake system.

As shown in FIG. 2, the Highly Automated Driving System (HADS) 200 includes a longitudinal deceleration controller 300 that adjusts an actual vehicle longitudinal deceleration $a_{ist}$ measured on the vehicle, for example, using a longitudinal deceleration sensor, to the target vehicle longitudinal deceleration $a_{soll}$ representing the respective service brake demand.

The at least one solenoid valve arrangement 1 of FIG. 4 can be formed in particular in a pressure control module 3 known per se, which is electrically controlled here, for example, by the first and second electronic brake control units Brake-ECU 1 and Brake-ECU 2 in order to control a regulated service brake pressure on the basis of a supply pressure originating from a pressure reservoir 4. The electrical control by the two electronic brake control units Brake-ECU 1 and Brake-ECU 2 specifies a target service brake pressure. For example, one such pressure control module 3 can be provided for the front axle and one for the rear axle of the vehicle, in particular a single-channel pressure control module on the front axle and a dual-channel pressure control module on the rear axle.

In a known manner, such a pressure control module 3 has an integrated local electronic control unit which receives a signal representing the set service brake pressure from the two electronic brake control units Brake-ECU 1 and Brake-ECU 2, furthermore the solenoid valve device 1, in particular as an inlet/outlet valve combination, as well as a relay valve pneumatically controlled by the solenoid valve device 1, via the operating output of which the actual service brake pressure is then output to at least one brake actuator 5, in this case at least one active service brake cylinder, which is measured by an integrated pressure sensor. The measured actual service brake pressure is then reported to the integrated local electronic control unit of the pressure control module 3, which then controls the integrated inlet/outlet valve combination to adjust the actual service brake pressure to the target service brake pressure. This realizes a service brake pressure control.

The characteristic curve 2 already mentioned above shows a relationship between the service brake pressure p and the service brake demand $a_{soll}$. The characteristic curve 2 therefore assigns a specific service brake pressure p to a specific service brake demand $a_{soll}$, as can be easily imagined from FIG. 1.

Figure 1:
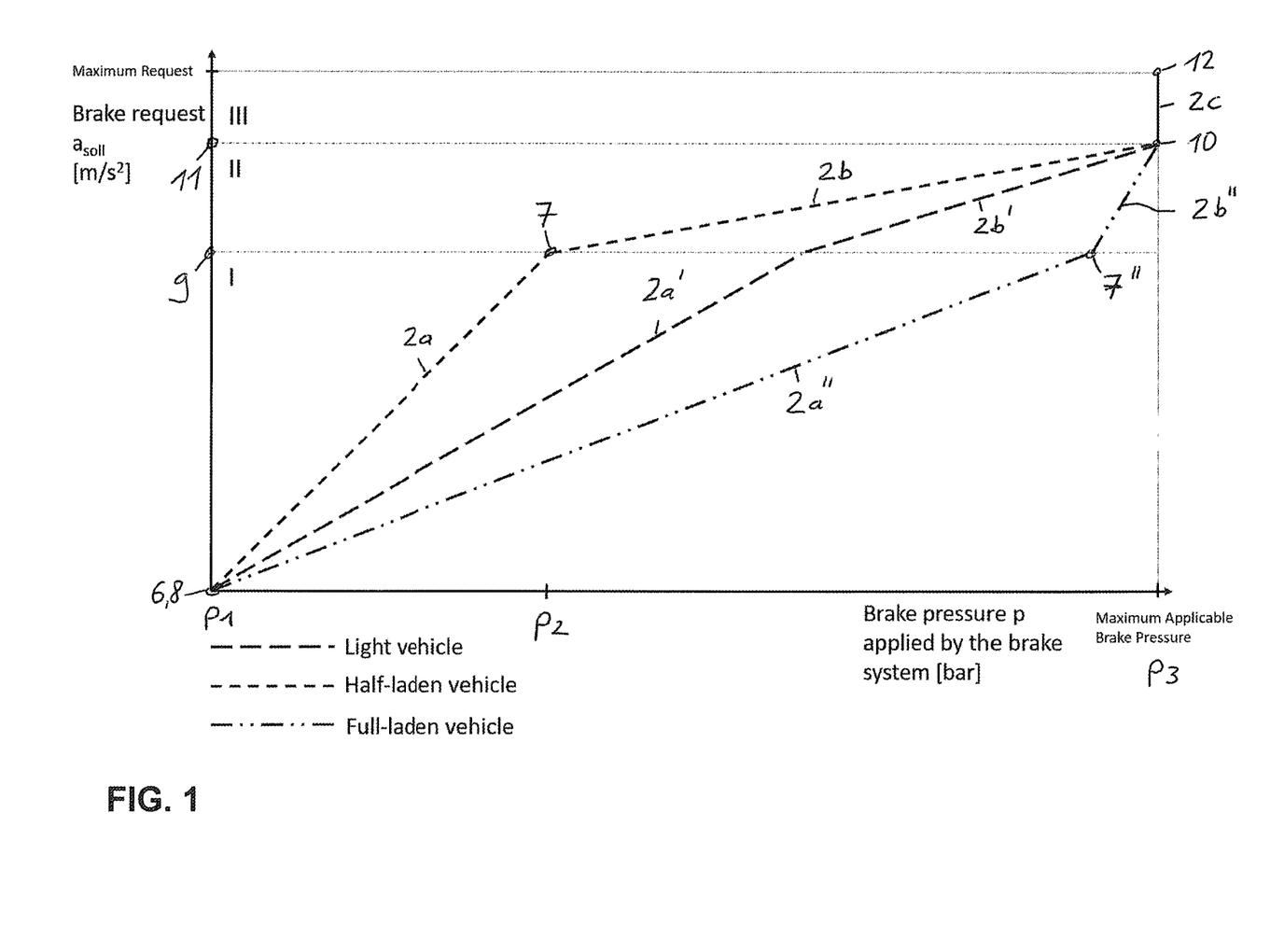
FIG. 1 an example of a characteristic curve showing a relationship between a brake demand and a brake pressure.

In order to form or define the characteristic curve 2 before its actual application or implementation, a service brake demand value range is defined or established for the service brake demand, which comprises a minimum service brake demand, a maximum service brake demand and intermediate values between the minimum service brake demand and the maximum service brake demand. The values of this service brake demand value range can be formed, for example, by a requested deceleration a in m/s$^2$ or also by a certain percentage, which then lies, for example, between 0% for the minimum service brake demand and 100% for the maximum service brake demand, with the limits included. In FIG. 1, this service brake demand value range is plotted on the Y axis.

Furthermore, a service brake pressure value range is also specified or defined for the service brake pressure p, which comprises a minimum service brake pressure (e.g. $p_{min}=0$), a maximum service brake pressure (maximum applicable brake pressure) and intermediate values between the minimum service brake pressure and the maximum service brake pressure (maximum applicable brake pressure). In FIG. 1, this range of service brake pressure values is plotted on the X axis.

A first interpolation or support point 6, 6', 6" is then defined by the characteristic curve 2, at which a first service brake demand limit value 8 and a first brake pressure $p_1$ are assigned to one another, the first service brake demand limit value 8 lying within the service brake demand value range and the first brake pressure $p_1$ lying within the brake pressure value range, and the first service brake demand limit value 8 representing a minimum service brake demand and the first service brake pressure representing a minimum service brake pressure. In the example of FIG. 1, the first service brake demand limit value 8 is equal to 0 m/s$^2$, for example, and the first service brake pressure is equal to 0 bar, for example. The first support point 6 of the characteristic curve 2 therefore may form the origin of the diagram of FIG. 1 here.

Furthermore, a second support point 7, 7', 7" of the characteristic curve 2 is defined or determined, at which a second service brake demand limit value 9 and a second brake pressure $p^2$ are assigned to one another, the second service brake demand limit value 9 lying within the service brake demand value range and being greater in amount than the amount of the minimum service brake demand but smaller than the amount of the maximum service brake demand. Furthermore, the second service brake pressure $p_2$ is within the service brake pressure value range and is greater than the minimum service brake pressure but less than the maximum service brake pressure (maximum applicable brake pressure). In this case, the second service brake demand limit value 9 represents, for example, the largest deceleration in terms of magnitude during partial braking.

Furthermore, a first characteristic curve section 2a, 2a', 2a" of the characteristic curve 2 is defined or determined, which extends between the first support point 6 and the second support point 8, and which, in a first brake demand range I, represents the relationship between the brake pressure p and the service brake demand $a_{soll}$. The first characteristic curve section 2a, 2a', 2a" therefore assigns a specific service brake pressure p here, for example, to a service brake demand $a_{soll}$ of a partial braking.

Furthermore, a third support point 10 of the characteristic curve is also defined, at which a third service brake demand limit value 11 and a third brake pressure $p_3$ are assigned to each other, wherein the third brake request limit value 11 lies within the brake request value range and is greater in amount than the amount of the second brake demand limit value 9 but less than or equal to the magnitude or amount of the maximum demand, and wherein the third brake pressure $p_3$ lies within the brake pressure value range and is equal to the maximum applicable brake pressure.

Furthermore, a second characteristic curve section 2b, 2b', 2b" of the characteristic curve 2 is also defined, which extends between the second support point 7 and the third support point 10, and which, in a second brake demand range II, represents the relationship between the brake pressure p and a brake demand $a_{soll}$.

Particularly, a third characteristic curve section 2c of the characteristic curve 2 may also be defined, which extends between the third support point 10 and a fourth support point 12 and automatically assigns the maximum brake pressure (maximum applicable brake pressure) to each brake request $a_{soll}$ within a third brake demand range III, the fourth support point 12 assigning the maximum brake pressure (maximum applicable brake pressure) and the maximum brake demand to each other. In this third characteristic curve section 2c, the maximum applicable brake pressure is automatically assigned to each brake demand $a_{soll}$ within the third brake demand range III, so that the third characteristic curve section represents a vertical line, as shown in FIG. 1.

As further shown in FIG. 1, the courses of the first, second and third characteristic curve sections 2a, 2a', 2a", 2b, 2b', 2b" and 2c may be linear, whereby the slopes of the first and second characteristic curve sections 2a, 2a', 2a", 2b, 2b', 2b" may differ. This also applies, for example, with inclusion of the third characteristic curve section 2c.

Also, for example, different characteristic curves are defined for different load conditions of the commercial vehicle, whereby in FIG. 1, the large dashed line symbolizes the first, second and third characteristic curve sections 2a', 2b', 2c of a lightly loaded commercial vehicle, the small dashed line symbolizes the first, second and third characteristic curve sections 2a, 2b, 2c of a medium loaded commercial vehicle and the dash-dotted lines symbolize the first, second and third characteristic curve sections 2a", 2b", 2c of a fully loaded commercial vehicle. Depending on the load, the slope of the linear first and second characteristic curve sections 2a, 2b therefore varies, while the third characteristic curve section 2c is the same for all load conditions, because the maximum brake pressure (maximum applicable brake pressure) may be always requested there.

As already indicated above, the characteristic curve 2 or the load-dependent characteristic curves 2a, 2b, 2c are respectively stored in a memory area of the first and second electronic brake control unit Brake-ECU 1, Brake-ECU 2.

Figure 3:
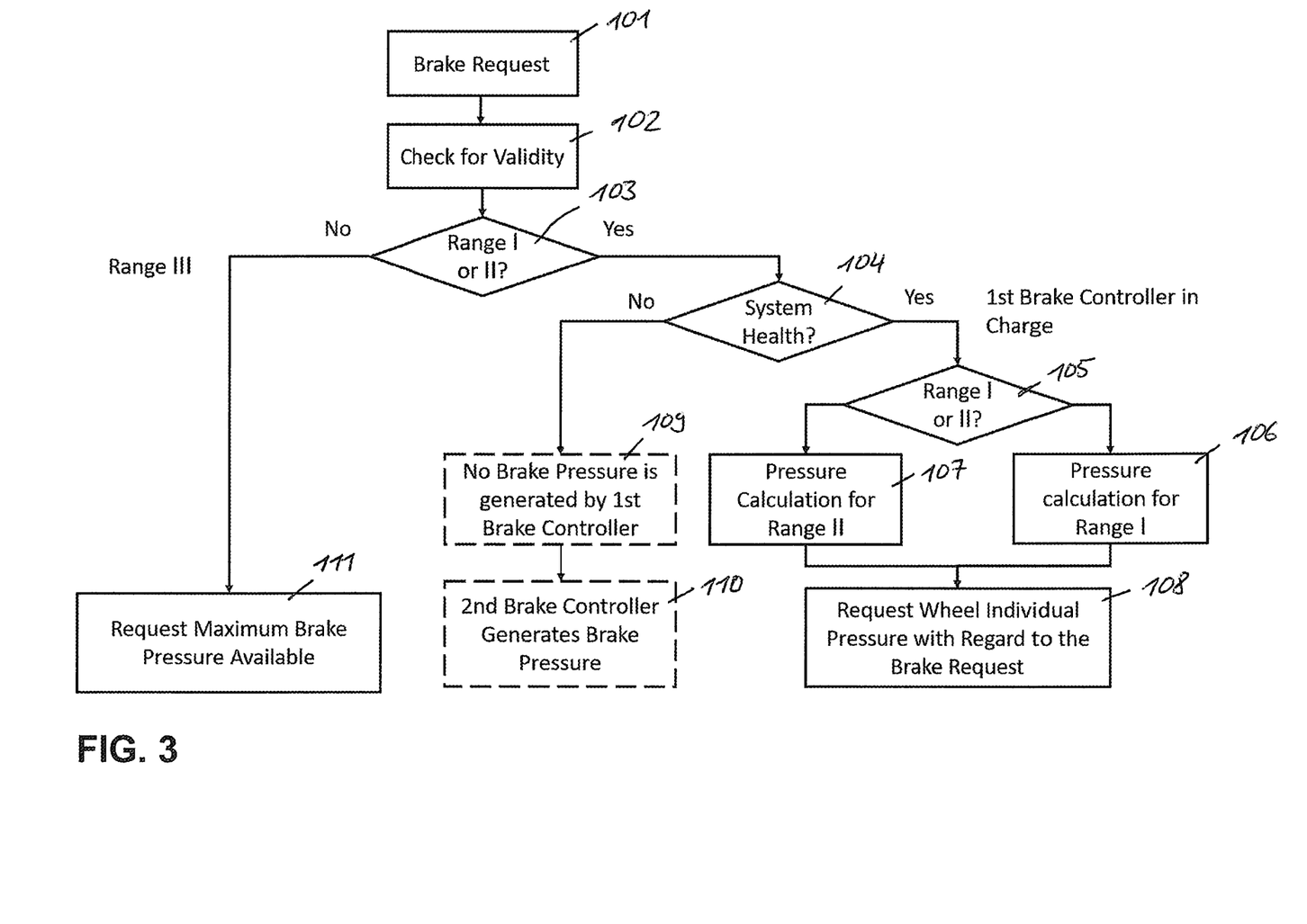
FIG. 3 a flow chart of an exemplary embodiment of a method for controlling the brake system.

FIG. 3 shows a flow chart of an exemplary embodiment of a method for operating the pressure fluid-actuated service brake system 100. In a step 101, a brake demand signal according to a brake demand $a_{soll}$ of the Highly Automated Driving System (HADS) 200 is input to the first and second electronic brake control units Brake-ECU 1 and Brake-ECU 2. This brake demand signal is verified in an optional step 102. In a subsequent step 103, it is verified whether the brake demand $a_{soll}$ represented by the brake demand signal is in the first brake demand range I or in the second brake demand range II (see FIG. 1). If this is the case, i.e. the brake demand $a_{soll}$ is either in the first brake demand range I or in the second brake demand range II, it is checked whether the first electronic brake control unit Brake-ECU 1 has a defect. If this is not the case, it is checked in a subsequent step 105 whether the brake demand $a_{soll}$, which is represented by the brake demand signal, lies in the first brake demand range I or alternatively in the second brake demand range II.

If the brake demand lies in the first brake demand range I, then the service brake pressure p is determined in a step 106 according to the first characteristic curve section 2a, 2a', 2a". If, however, the service brake demand $a_{soll}$ lies in the second brake demand range II, then in a step 107 the service brake pressure p is determined according to the second characteristic curve section 2b, 2b', 2b". The optionally additionally executed common step 108 then comprises a wheel-individual control or regulation of the service brake pressure p. The service brake pressure p determined on the basis of characteristic curve 2 is then applied to the at least one brake actuator 5.

This service brake pressure p then provides an actual longitudinal deceleration $a_{ist}$ of the commercial vehicle in the at least one service brake actuator 5, which is then adapted by the longitudinal deceleration controller 300 of FIG. 2 to the target longitudinal deceleration $a_{soll}$ corresponding to the brake demand or requirement.

If it is determined in step 104 that the first electronic brake control unit Brake-ECU 1 has a defect, the at least one solenoid valve device 1 or the at least one pressure control module 3 cannot be actuated by the first electronic brake control unit Brake-ECU 1 in accordance with step 109 in order to generate the service brake pressure p by controlling the at least one pressure control module 3 or the at least one solenoid valve device 1. In this case, the intact second electronic brake control unit Brake-ECU 2, which is redundant with respect to the first electronic brake control unit Brake-ECU 1, then ensures implementation of the service brake request in accordance with steps 105, 106 or 107 and 108, as described above.

If it is determined in step 103 that the brake demand or the target vehicle longitudinal deceleration $a_{soll}$ is neither in the first brake demand range I nor in the second brake demand range II but in the third brake demand range III, no check of the first electronic brake control unit Brake-ECU 1 and/or the second electronic brake control unit Brake-ECU 2 or further components of the service brake system 100 need take place. Rather, as shown in FIG. 1, the maximum brake pressure (maximum applicable pressure) is then assigned to each brake demand $a_{soll}$ in the third brake demand range III, which is then generated by the at least one pressure control module 3 or the at least one solenoid valve device 1 based on the reservoir pressure of the pressure reservoir 4 and is fed into the at least one brake actuator 5.

The invention is not limited to an application to a service brake system 100, it can readily be applied to a park brake system to control/regulate parking brake pressure. Because of the passive brake spring cylinders as normally used in such a parking brake system, the maximum pressure becomes the minimum pressure and vice versa.

The List of References is as follows:
1 solenoid valve device
2 characteristic curve (map)
2*a*, 2*a*', 2*a*" first characteristic curve section
2*b*, 2*b*', 2*b*" second characteristic curve section
2*c* third characteristic curve section
3 pressure regulator
4 pressure reservoir
5 brake actuator
6 first support point
7 second support point
8 first brake demand limit value
9 second brake demand limit value
10 third support point
11 third brake demand limit value
12 fourth support point
100 service brake system
200 highly automated driving system
300 longitudinal deceleration controller
Brake-ECU1 first brake control unit
Brake-ECU2 second brake control unit
$a_{ist}$ actual vehicle longitudinal deceleration
$a_{soll}$ target vehicle longitudinal deceleration (brake demand)
I first brake demand range
II second brake demand range
III third brake demand range

What is claimed is:

1. A method for defining at least one characteristic curve which, in a pressure-actuated brake system of a vehicle, represents a relationship between a brake pressure and a brake demand), the method comprising:
    a) specifying a brake demand value range for the brake demand, which includes a minimum brake demand, a maximum brake demand, and intermediate values between the minimum brake demand and the maximum brake demand,
    b) specifying a brake pressure value range for the brake pressure, which includes a minimum brake pressure, a maximum brake pressure and intermediate values between the minimum brake pressure and the maximum brake pressure,
        b1) defining a support point of the characteristic curve, at which a brake demand limit value and a specific brake pressure are associated with each other, wherein the brake demand limit value lies within the brake demand value range and is greater in amount than the amount of the minimum brake demand but less than the amount of the maximum brake demand, and wherein the specific brake pressure lies within the brake pressure value range and is equal to the maximum brake pressure,
        b2) defining another support point that assigns the maximum brake pressure and the maximum brake demand to each other,
        b3) defining a characteristic curve section of the characteristic curve, which extends between the support point and the another support point, and which automatically assigns the maximum brake pressure to each brake request in a brake demand range.

2. The method of claim 1, wherein the support point is a third support point of the characteristic curve and the another support point is a fourth support point of the characteristic curve and the characteristic curve section is a third characteristic curve section of the characteristic curve and the brake demand range is a third brake demand range and the brake demand limit value is a third brake demand limit value and the specific brake pressure is a third brake pressure.

3. The method of claim 2, wherein the third brake demand limit is smaller in amount than the amount of the maximum brake demand.

4. The method of claim 2, further comprising:
    defining at least two further characteristic curve sections of the characteristic curve, by:
        a) defining a first support point of the characteristic curve, at which a first brake demand limit value and a first brake pressure are assigned to one another, the first brake demand limit value lying within the brake demand value range and the first brake pressure lying within the brake pressure value range, and the first brake demand limit value representing a minimum brake demand and the first brake pressure representing a minimum brake pressure,
        b) defining a second support point of the characteristic curve, at which a second brake demand limit value and a second brake pressure are associated with each other, wherein the second brake demand limit value lies within the brake demand value range and is greater in amount than the amount of the minimum brake demand but smaller than the amount of the maximum brake demand, and wherein the second brake pressure is within the brake pressure value range and is greater than the minimum brake pressure but less than the maximum brake pressure,
        c) defining a first characteristic curve section of the characteristic curve which extends between the first support point and the second support point and which, in a first brake demand range, represents the relationship between the brake pressure and the brake demand,
        d) defining a second characteristic curve section of the characteristic curve which extends between the second support point and the third support point and which, in a second brake demand range, represents the relationship between the brake pressure and a brake demand.

5. The method of claim 4, wherein the first characteristic curve section and/or the second characteristic curve section and/or the third characteristic curve section has a linear course.

6. The method of claim 4, wherein the third characteristic curve section directly adjoins the second characteristic curve section and that the second characteristic curve section directly adjoins the first characteristic curve section.

7. The method of claim 4, wherein the first characteristic curve section and/or the second characteristic curve section and/or the third characteristic curve section are formed or specified as a function of a vehicle load of the vehicle, the vehicle load being determined or estimated.

8. The method of claim 1, wherein the minimum brake demand and the minimum brake pressure are each equal to zero.

9. A characteristic curve, comprising:

a curve which, in a pressure-fluid-actuated brake system, represents a relationship between a brake pressure and a brake demand;

wherein the curve has been defined or determined by performing the following:

a) specifying a brake demand value range for the brake demand, which includes a minimum brake demand, a maximum brake demand, and intermediate values between the minimum brake demand and the maximum brake demand, b) specifying a brake pressure value range for the brake pressure, which includes a minimum brake pressure, a maximum brake pressure and intermediate values between the minimum brake pressure and the maximum brake pressure, b1) defining a support point of the characteristic curve, at which a brake demand limit value and a specific brake pressure are associated with each other, wherein the brake demand limit value lies within the brake demand value range and is greater in amount than the amount of the minimum brake demand but less than the amount of the maximum brake demand, and wherein the specific brake pressure lies within the brake pressure value range and is equal to the maximum brake pressure, b2) defining another support point that assigns the maximum brake pressure and the maximum brake demand to each other, b3) defining a characteristic curve section of the characteristic curve, which extends between the support point and the another support point, and which automatically assigns the maximum brake pressure to each brake request in a brake demand range.

10. A method for operating a pressure-medium-actuated brake system of a vehicle, in which at least one brake cylinder can be acted upon by a pressure medium which is under a brake pressure, and in which the brake pressure is determined on the basis of at least one characteristic curve which represents a relationship between the brake pressure and a brake demand, the method comprising:

checking whether the brake demand lies in the third brake demand range, and if so, determining the brake pressure based on the third characteristic curve section, and then the at least one brake cylinder is acted upon with the maximum brake pressure, and if not, determining the brake pressure based on the third characteristic curve section;

wherein the at least one characteristic curve has been defined or determined by performing the following:

a) specifying a brake demand value range for the brake demand, which includes a minimum brake demand, a maximum brake demand, and intermediate values between the minimum brake demand and the maximum brake demand, b) specifying a brake pressure value range for the brake pressure, which includes a minimum brake pressure, a maximum brake pressure and intermediate values between the minimum brake pressure and the maximum brake pressure, b1) defining a support point of the characteristic curve, at which a brake demand limit value and a specific brake pressure are associated with each other, wherein the brake demand limit value lies within the brake demand value range and is greater in amount than the amount of the minimum brake demand but less than the amount of the maximum brake demand, and wherein the specific brake pressure lies within the brake pressure value range and is equal to the maximum brake pressure, b2) defining another support point that assigns the maximum brake pressure and the maximum brake demand to each other, b3) defining a characteristic curve section of the characteristic curve, which extends between the support point and the another support point, and which automatically assigns the maximum brake pressure to each brake request in a brake demand range.

11. The method of claim 10, wherein the brake system includes at least one electronic brake control unit, and at least one solenoid valve device controlled by the at least one electronic brake control unit, wherein the characteristic curve is implemented in the at least one electronic brake control unit, and wherein the brake demand is input into the at least one electronic brake control unit, and wherein the at least one electronic brake control unit electrically actuate the at least one solenoid valve device as a function of the brake demand to generate the brake pressure.

12. The method of claim 11, wherein no check is made whether the at least one electronic brake control unit is defective.

13. The method of claim 10, wherein the brake system includes at least two independent electronic brake control units, a first electronic brake control unit and a second electronic brake control unit, and at least one solenoid valve device controlled independently by the first electronic brake control unit and the second electronic brake control unit, wherein the characteristic curve is implemented in the first electronic brake control unit and in the second electronic brake control unit, and wherein the brake demand is input into the first electronic brake control unit and into the second electronic brake control unit, and wherein the first electronic brake control unit and the second electronic brake control unit electrically actuate the at least one solenoid valve device independently of one another as a function of the brake demand, in order to generate the brake pressure.

14. The method of claim 10, further comprising:

a) determining the brake pressure based on the first characteristic curve section or the second characteristic curve section depending on the brake demand at least by:

a1) checking whether the brake demand is in the first brake demand range or in the second brake demand range, and a2) if the brake demand is in the first brake demand range, then determining the brake pressure according to the first characteristic curve section, and a3) if the brake demand lies in the second brake demand range, then determining the brake pressure according to the second characteristic curve section, and then b) applying the determined brake pressure to the at least one brake cylinder.

15. The method of claim 13, wherein:

a) if the brake demand is in the first brake demand range or in the second brake demand range, it is checked whether an electronic brake control unit of the first electronic brake control unit or the second electronic brake control unit has a defect, and if this is the case, then the at least one solenoid valve device is controlled by the remaining functional electronic brake control unit which has no defect in order to generate the brake pressure, but b) if the brake demand is in the third brake demand range, no check is made whether an electronic brake control device of the first electronic brake control device and/or the second electronic brake control device is defective, and the at least one solenoid valve device is actuated by the first electronic brake control device and/or by the second electronic brake control device to generate the brake pressure.

16. The method of claim 15, wherein the check as to whether an electronic brake control unit of the first electronic brake control unit and/or the second electronic brake control unit has a defect is carried out by self-monitoring of the first electronic brake control unit and the second electronic brake control unit, or by external monitoring, the first and second electronic brake control units monitoring each other.

17. The method of claim 10, wherein the brake demand, based on which the brake pressure is determined using the characteristic curve, is generated by a vehicle longitudinal deceleration control system, a driver assistance system and/or by an autonomous vehicle control system.

18. The method of claim 17, wherein the vehicle longitudinal deceleration control controls an estimated or determined actual vehicle longitudinal deceleration to a target vehicle longitudinal deceleration, wherein the brake demand, based on which the brake pressure is determined using the characteristic curve, being formed as a function of the target vehicle longitudinal deceleration).

19. The method of claim 10, wherein the brake system includes at least one of:
   a) an electro-pneumatic service brake system, wherein the at least one brake cylinder is an active brake cylinder which is applied by increasing the brake pressure in the application direction and by decreasing the brake pressure in the release direction, and/or
   b) an electro-pneumatic parking brake system, wherein the at least one brake cylinder is a passive spring-brake cylinder which is applied by increasing the brake pressure in the release direction and by decreasing the brake pressure in the application direction.

20. A pressure medium-actuated brake system of a vehicle, comprising:
   at least one brake cylinder can be acted upon by a pressure medium which is under a brake pressure;
   wherein the pressure-medium-actuated brake system, in which the at least one brake cylinder can be acted upon by the pressure medium which is under the brake pressure, and in which the brake pressure is determined based on least one characteristic curve which represents a relationship between the brake pressure and a brake demand, is controlled by performing the following:
   checking whether the brake demand lies in the third brake demand range, and if so, determining the brake pressure based on the third characteristic curve section, and then the at least one brake cylinder is acted upon with the maximum brake pressure, and if not, determining the brake pressure based on the third characteristic curve section;
   wherein the at least one characteristic curve has been defined or determined by performing the following:
   a) specifying a brake demand value range for the brake demand, which includes a minimum brake demand, a maximum brake demand, and intermediate values between the minimum brake demand and the maximum brake demand,
   b) specifying a brake pressure value range for the brake pressure, which includes a minimum brake pressure, a maximum brake pressure and intermediate values between the minimum brake pressure and the maximum brake pressure,
   b1) defining a support point of the characteristic curve, at which a brake demand limit value and a specific brake pressure are associated with each other, wherein the brake demand limit value lies within the brake demand value range and is greater in amount than the amount of the minimum brake demand but less than the amount of the maximum brake demand, and wherein the specific brake pressure lies within the brake pressure value range and is equal to the maximum brake pressure,
   b2) defining another support point that assigns the maximum brake pressure and the maximum brake demand to each other,
   b3) defining a characteristic curve section of the characteristic curve, which extends between the support point and the another support point, and which automatically assigns the maximum brake pressure to each brake request in a brake demand range.

21. The pressure-medium operated brake system of claim 20, wherein it includes at least two independent electronic brake control units, a first electronic brake control unit and a second electronic brake control unit, and at least one solenoid valve device independently controlled by the first electronic brake control unit and the second electronic brake control unit, wherein the characteristic curve is implemented in the first electronic brake control unit and in the second electronic brake control unit, and wherein the brake request is input into the first electronic brake control unit and into the second electronic brake control unit, and wherein the first electronic brake control unit and the second electronic brake control unit electrically actuate the at least one solenoid valve device independently of one another as a function of the brake demand to generate the brake pressure.

* * * * *